US009148349B1

(12) United States Patent　　(10) Patent No.: US 9,148,349 B1
Burr et al.　　(45) Date of Patent: Sep. 29, 2015

(54) DYNAMIC GRAPHICAL DISPLAY OF COMPONENTS IN A DATA STORAGE SYSTEM

(75) Inventors: Robin Christine Burr, West Townsend, MA (US); Patricia B. Campbell, Franklin, MA (US); Sreenath Rajagopal, Natick, MA (US); Paula Emily McAdam, Shrewsbury, MA (US); Nethaji Kapavarapu, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 1525 days.

(21) Appl. No.: 12/490,875

(22) Filed: Jun. 24, 2009

(51) Int. Cl.
　　*G06F 3/048*　　(2013.01)
　　*H04L 12/24*　　(2006.01)
　　*G06F 3/0482*　　(2013.01)
　　*G06F 3/0481*　　(2013.01)
　　*G06F 9/44*　　(2006.01)

(52) U.S. Cl.
　　CPC .............. *H04L 41/22* (2013.01); *G06F 3/0481* (2013.01); *G06F 3/0482* (2013.01); *H04L 41/12* (2013.01); *G06F 9/4443* (2013.01)

(58) Field of Classification Search
　　CPC ....... H04L 41/12; H04L 41/22; G06F 3/0481; G06F 3/0482; G06F 3/04842
　　USPC .................................................. 715/734–738
　　See application file for complete search history.

(56) References Cited

U.S. PATENT DOCUMENTS

| 6,822,698 | B2* | 11/2004 | Clapper ........................ 348/734 |
| 6,966,033 | B1* | 11/2005 | Gasser et al. ................. 715/738 |
| 7,502,669 | B1* | 3/2009 | Evans et al. ................... 700/302 |
| 7,533,169 | B1* | 5/2009 | Gold et al. .................... 709/224 |
| 7,640,325 | B1* | 12/2009 | DeKoning et al. ............. 709/223 |
| 2003/0179227 | A1* | 9/2003 | Ahmad et al. ................ 345/736 |
| 2010/0107077 | A1* | 4/2010 | Hanawa et al. ............... 715/716 |

OTHER PUBLICATIONS

"EMC CLARiiON CX Series," EMC Corporation, Data Sheet, 2004.

* cited by examiner

*Primary Examiner* — Claudia Dragoescu
(74) *Attorney, Agent, or Firm* — BainwoodHuang

(57) ABSTRACT

In a storage system management device, a method for graphically displaying a component of a data storage system. The method includes mapping, by the storage system management device, each component of a set of components of the data storage system to at least one graphical image of the component, displaying, by the storage system management device, a tree table of the set of components of the data storage system, and outputting, by the storage system management device, at least one graphical image of a component of the set of components selected from the tree table.

19 Claims, 9 Drawing Sheets

DYNAMIC GRAPHICAL DISPLAY OF COMPONENTS IN A DATA STORAGE SYSTEM

BACKGROUND

A typical data storage system stores and retrieves data for one or more external host devices. Conventional data storage systems typically include processing circuitry and a set of disk drives electrically coupled to the processing circuitry. The processing circuitry includes one or more ports, such as Ethernet ports, that allow the host devices to connect to the processing circuitry. The processing circuitry is typically configured to perform load and store operations on the set of disk drives on behalf of the host devices.

In certain data storage systems, the disk drives of the data storage system are distributed among one or more separate disk drive enclosures and processing circuitry serves as a front-end to the disk drive enclosures. The processing circuitry presents the disk drives of the enclosures to the host device as a single, logical storage location and allows the host device to access the disk drives such that the individual disk drives and disk drive enclosures are transparent to the host device.

SUMMARY

Conventional data storage systems suffer from a variety of deficiencies. For example, in a data storage system, a conventional system enclosure can contain a processing circuitry unit and multiple disk drive enclosures, where each disk drive enclosure can include multiple disk drives. In order to allow an end-user to track the number of disk drive enclosures and other hardware components contained by the system enclosure, the conventional data storage system is configured to generate and output a tree table that lists all of components of the system enclosure. However, this listing does not provide the end-user with an indication as to the physical location of the hardware within the system enclosure. Accordingly, while the end-user would know that the system enclosure includes a particular piece of hardware, the end-user can encounter difficulty in ascertaining the location of the particular hardware component within the physical enclosure, such as necessary to correct a fault in the system.

By contrast, embodiments of the invention are related to the dynamic graphical display of components in a data storage system. The data storage system includes a storage system management device that tracks the physical hardware components included within a data storage system. The storage system management device also provides an end-user with a graphical user interface (GUI) that displays a tree table of the hardware components, such as disk drive enclosures, included within a data storage system and corresponding hardware diagrams of the hardware components selected from the tree table. The storage system management device is also configured to highlight selected subcomponents of the hardware diagram, such as specific disk drives included within the disk drive enclosure. Accordingly, the storage system management device allows the end-user to view the diagram of the physical hardware component selected and to correlate a selected hardware component or subcomponent within the diagram with the location of the actual physical hardware included within an enclosure. With such an approach, the storage system management device aids the end-user in identifying a particular hardware component contained within the enclosure, such as necessary when a faulty component requires replacement.

In one arrangement, a storage system management device is configured to graphically display a component of a data storage system. The storage system management device maps each component of a set of components of the data storage system to at least one graphical image of the component. The storage system management device displays a tree table of the set of components of the data storage system. The storage system management device outputs at least one graphical image of a component of the set of components selected from the tree table.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the invention are related to the dynamic graphical display of components in a data storage system. The data storage system includes a storage system management device that tracks the physical hardware components included within a data storage system. The storage system management device also provides an end-user with a graphical user interface (GUI) that displays a tree table of the hardware components, such as disk drive enclosures, included within a data storage system and corresponding hardware diagrams of the hardware components selected from the tree table. The storage system management device is also configured to highlight selected subcomponents of the hardware diagram, such as specific disk drives included within the disk drive enclosure. Accordingly, the storage system management device allows the end-user to view the diagram of the physical hardware component selected and to correlate a selected hardware component or subcomponent within the diagram with the location of the actual physical hardware included within an enclosure. With such an approach, the storage system management device aids the end-user in identifying a particular hardware component contained within the enclosure, such as necessary when a faulty component requires replacement.

Figure 1:
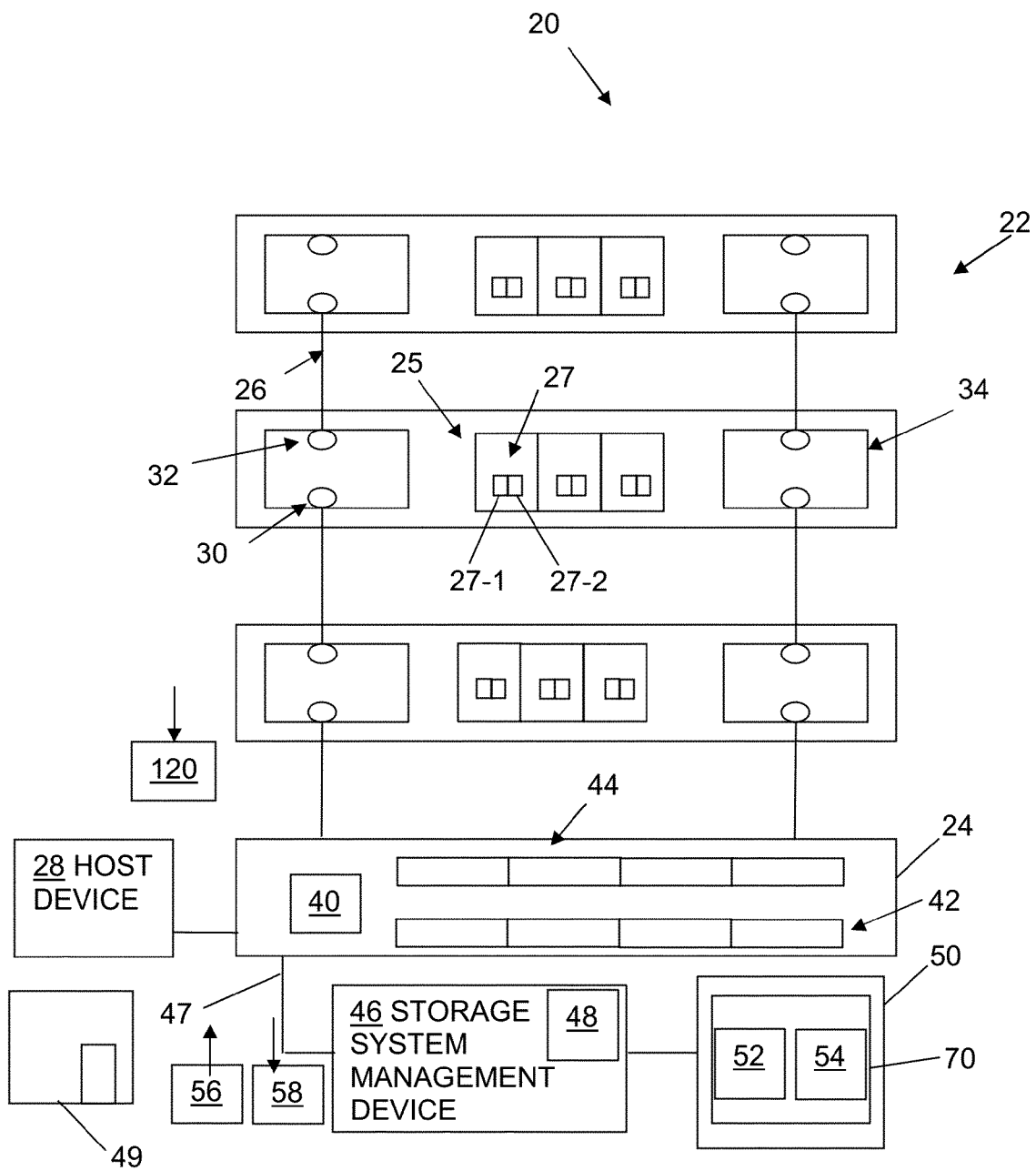
FIG. 1 illustrates a schematic representation of a data storage system having a storage system management device disposed in electrical communication with components of the data storage system.

FIG. 1 illustrates an example arrangement of a data storage system 20. The data storage system 20 includes a set of components, such as one or more disk enclosures 22 and a disk processor enclosure 24. The data storage system 20 is formed in a modular fashion where the disk enclosures 22 and the disk processor enclosure 24 are installed within a standard rack (not shown) and electrically interconnected by electrical connections, such as cables 26.

In the data storage system 20, each of the disk enclosures 22 includes an array of magnetic memory units or disk drives 25. For example, each of the disk enclosures 22 includes several disk drives 25 operable to store data received from a host device 28 or to provide data requested from the host device 28. In the example data storage system 20, each disk drive 25 includes one or more status indicators 27 to provide a visual indication regarding the operation of the respective disk drives 25. For example, each disk drive 25 can include a disk activity indicator 27-1 and a fault indicator 27-2. While the status indictors 27-1, 27-2 can be configured in a variety of ways, in one arrangement, the status indicators 27-1, 27-2 are configured as light emitting diodes (LEDs).

Each of the disk enclosures 22 includes an input port 30 and an output port 32 that provide interconnection of the disk enclosures 22 and the disk processor enclosure 24. It is noted that the terms "input port" and "output port" are used to merely distinguish the ports 30, 32 on each disk enclosure 22. One of ordinary skill in the art will understand that the input and output ports 30, 32 on each enclosure 22 allow bidirectional communication within the data storage system 20, both to and from the host device 28. Each disk enclosure 22 of the data storage system 20 includes a controller 34, such as a link control card (LCC), electrically coupled to the input and output ports 30, 32 of the disk enclosure 22 and configured to provide for data communication among the disk enclosures 22. In one arrangement, each disk enclosure 22 of the data storage system 20 also includes a power module (not shown) configured to provide operational power to the disk drives 25 and controllers 34 and a fan module (not shown) configured to remove heat from the disk drives 25 and controllers 34 during operation.

The disk processor enclosure 24 includes one or more controllers or storage processors 40 configured to control certain functions of the data storage system 20. For example, the storage processor 40 is configured to perform load and store operations on the magnetic storage devices 25 of the disk enclosures 22 on behalf of the host device 28. The disk processor enclosure 24 also includes a first and a second set of input/output (I/O) modules 42, 44. The I/O modules are configured to allow electrical interconnection of the host device 28 and the disk enclosures 22 to the disk processor enclosure 24. While the I/O modules 42, 44 can have a variety of configurations, in one arrangement, the I/O modules 42, 44 are configured as iSCSI or fibre channel modules.

The data storage system 20 also includes a storage system management device 46 disposed in electrical communication with the data storage system 20 through the disk processor enclosure 24. The storage system management device 46 can electrically communicate with the data storage system 20 in a variety of ways. For example, in the case where the storage system management device 46 is located at the site of the data storage system 20, the storage system management device 46 can be disposed in electrical communication with the data storage system 20 via a cable 47. Additionally, the storage system management device 46 can be disposed in electrical communication with the data storage system 20 by way of a network connection, such as a remote network connection.

The storage system management device 46, such as a computerized device, includes a controller 48, such as a memory and a processor. In one arrangement, the controller 48 stores a storage system management application. The storage system management application installs on the storage system management device 46 from a computer program product 49. In some arrangements, the computer program product 49 is available in a standard off-the-shelf form such as a shrink wrap package (e.g., CD-ROMs, diskettes, tapes, etc.). In other arrangements, the computer program product 49 is available in a different form, such downloadable online media. For example, the system management application can be downloaded from a web server on the data storage system 20 when the storage system management device 46 is connected via a web browser. When performed on the controller 48 of the storage system management device 46, the storage system management application causes the storage system management device 46 to cause a display device 50, such as a monitor, to display a storage system interface 70. The storage system interface 70 includes an image of a tree table 52 listing the hardware components of the data storage system 20 and an image of a corresponding hardware diagram 54 of a hardware component selected from the tree table.

Figure 2:
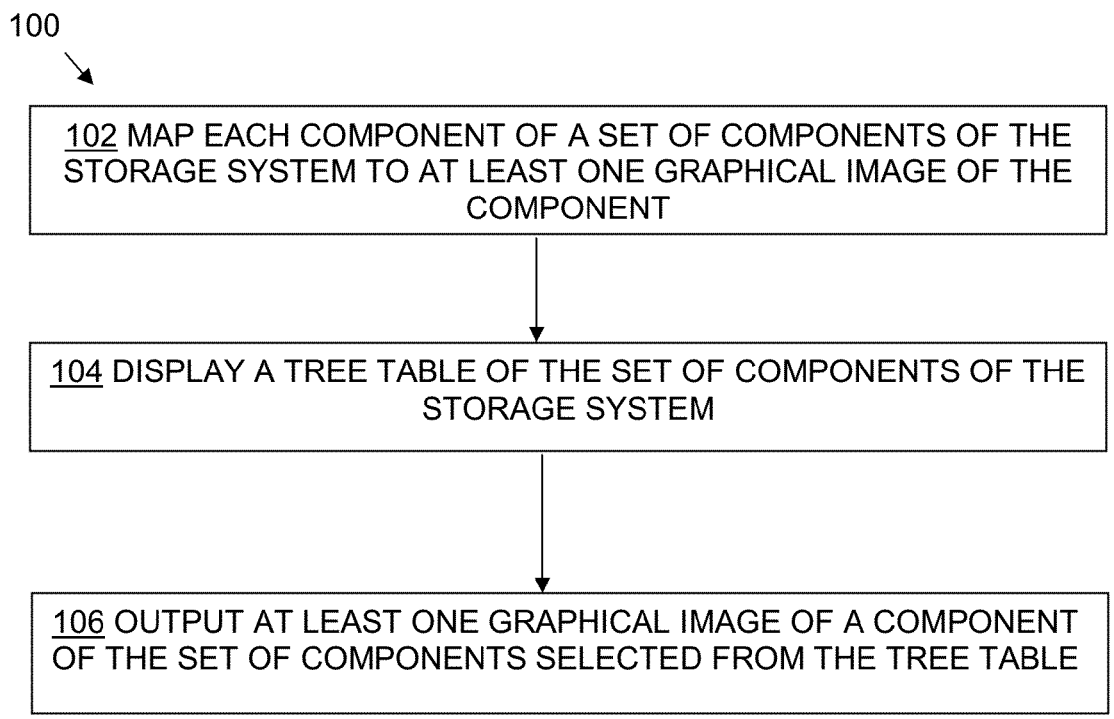
FIG. 2 is a flowchart that illustrates a procedure performed by the storage system management device of FIG. 1.

FIG. 2 is a flowchart 100 that illustrates a procedure performed by the storage system management device 46 when graphically displaying a component of the data storage system 20.

In step 102, the storage system management device 46 maps each component of a set of components of the data storage system 20 to at least one graphical image of the component. In one arrangement, as indicated in FIG. 1, at the startup of the data storage system 20, the storage system management device 46 transmits a request message 56 to each disk enclosure component 22 of the data storage system 20 to request configuration information relating to each component 22. Based upon receipt of the request message 56, each disk enclosure 22 transmits configuration information 58 relating to the hardware configuration of the disk enclosure 22 to the storage system management device 46. For example, the configuration information 58 includes data relating to the model of the disk enclosure 22, the serial number of the disk enclosure 22, and the physical location and orientation of the subcomponents (e.g., the disk drives 25, status indicators 27, ports 30, 32, and controllers 34) contained by the disk enclosure 22. Based upon the configuration information 58 received for a given disk enclosure 22, the storage system management device 24 searches a graphical image database, such as stored by the controller 48, and correlates a preconfigured image of the disk enclosure with the physical disk enclosure 22 of the data storage system 20.

Figure 3:
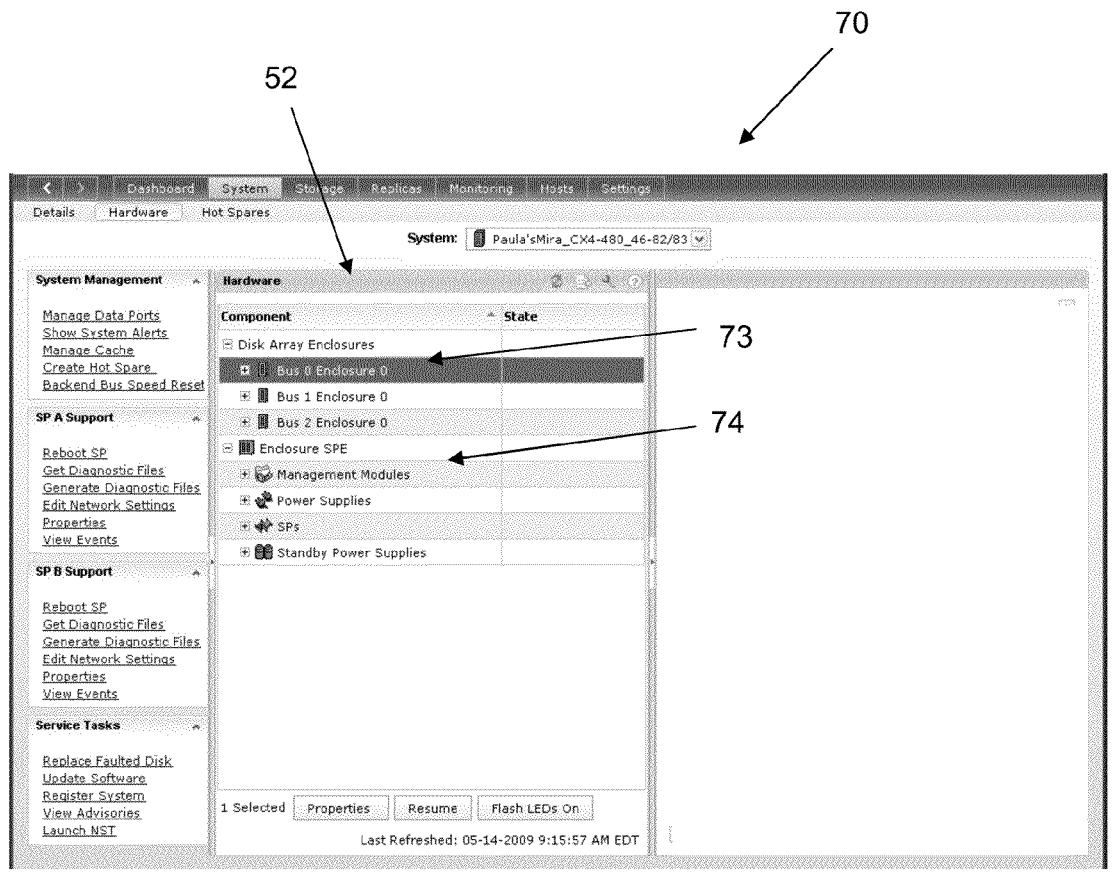
FIG. 3 illustrates a storage system interface as provided by the storage system management device of FIG. 1, the storage system interface displaying a tree table of the components of the data storage system of FIG. 1.

Returning to FIG. 2, in step 104, the storage system management device 46 displays a tree table 52 of the set of components of the data storage system 20. In one arrangement, as the storage system management device 46 receives the configuration information 58 from each disk enclosure 22, the storage system management device 46 builds a tree table that lists each disk enclosure 22 of the data storage system 20. The storage system management device 46 then displays the tree table 52 as part of a graphical user or storage system interface 70 on the associated display device 50. For example, FIG. 3 illustrates the storage system interface 70 showing a tree table 52 for the components of the data storage system 20. As shown, the tree table 52 provides a listing of the disk enclosures 72 of the data storage system 20 and a listing of the disk processor enclosure 74, including the subcomponents of the disk processor enclosure 74. With such a display of the storage system interface 70, the storage system management device 46 provides an end-user with a listing of the components within a given data storage system 20.

Figure 4:
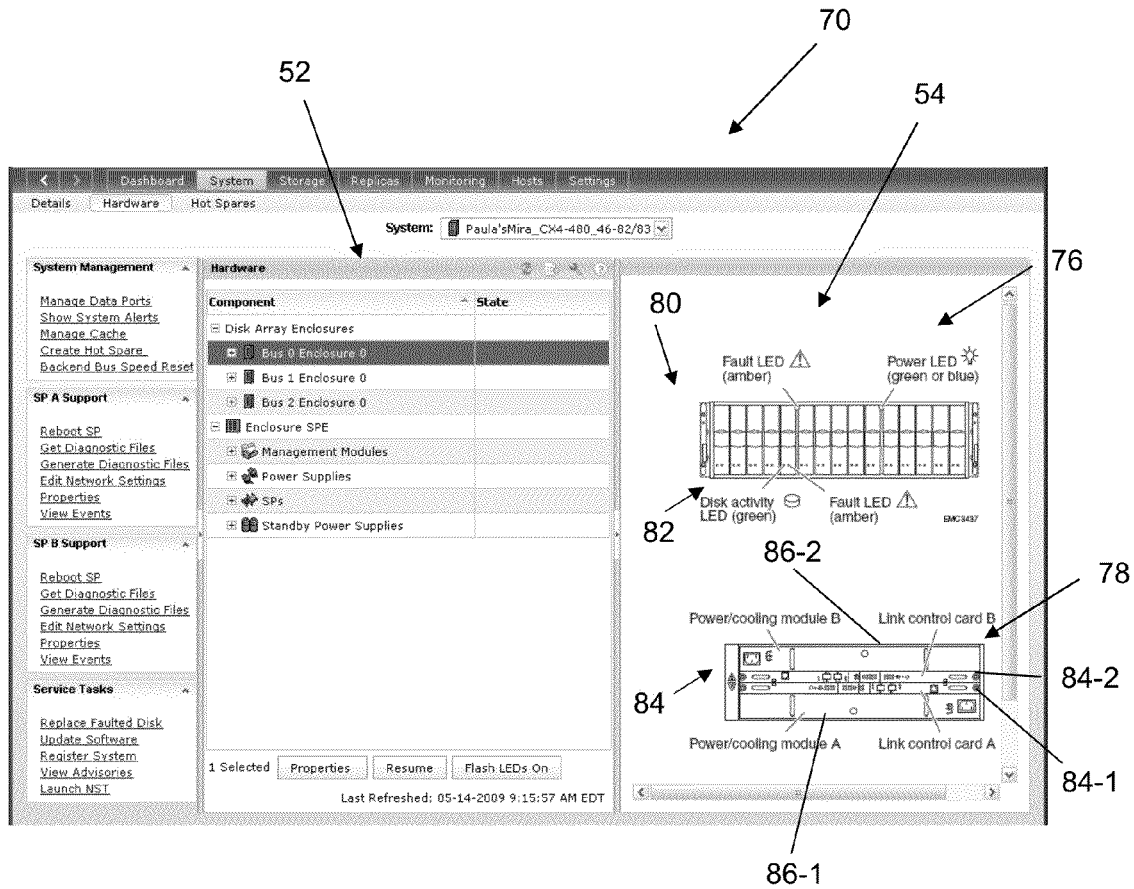
FIG. 4 illustrates a storage system interface as provided by the storage system management device of FIG. 1, the storage system interface displaying a tree table of the components of the data storage system of FIG. 1 and a hardware component selected from the tree table.

Returning to FIG. 2, in step 106, the storage system management device 46 outputs at least one graphical image 54 of a component of the set of components selected from the tree table 52. In one arrangement, as shown in FIG. 4, the storage system management device 46 is configured to initially display a graphical image 54 of a default component, such as a disk enclosure 22, as part of the storage system interface 70. For example, as shown in the tree table 52, the storage system management device 46 provides the disk enclosure 22 labeled "Bus 0 Enclosure 0" as a default selected disk drive enclosure component of the data storage system 20 and highlights 73 the "Bus 0 Enclosure 0" entry in the tree table listing of the disk enclosures 72. Based upon the mapping of the configuration information 58 for the "Bus 0 Enclosure 0" disk enclosure 22 with a graphical image of the "Bus 0 Enclosure 0" disk enclosure 22, the storage system management device 46 outputs a graphical image 54, such as a line drawing, of the "Bus 0 Enclosure 0" disk enclosure 22 as part of the storage system interface 70.

After the storage system management device 46 displays the graphical image 54 of the default component (i.e., "Bus 0 Enclosure 0") a user can utilize the tree table 52 to cause the storage system management device 46 to display graphical images of other components of the data storage system 20. For example, with continued reference to FIG. 4, assume a user wants the storage system management device 46 to display a graphical image of the disk enclosure labeled "Bus 2 Enclosure 0" in the tree table 52. In this case the user scrolls a cursor over component labeled "Bus 2 Enclosure 0" in the listing of the disk enclosures 72 and activates the storage system management device 46 to display an associated image, such as by clicking on the "Bus 2 Enclosure 0" using an input tool, such as a keyboard or a mouse. In response, the storage system management device 46 displays a graphic image of the "Bus 2 Enclosure 0," contained by the data storage system 20, as part of the storage system interface 70.

The storage system management device 46 can provide a variety of types of graphical images 54 of the components of the data storage system 20 as part of the storage system interface 70. In one arrangement, as illustrated in FIG. 4, the storage system management device 46 is configured to provide an image of a first or front view 76 of a component, such as the disk enclosure 22 and an image of a second or rear view 78, opposing the front view 76, of the component. Additionally, in one arrangement, for each of the images of the front and rear views 76, 78 of a given storage system component, the storage system management device 46 is configured to provide detailed images of the subcomponents carried by a particular storage system component. For example, in the image of the front view 76 of the disk enclosure 22 the storage system management device 46 provides graphical images of a set of disk drives 80 carried by the disk enclosure 22, as well as graphical images of the status indicators 82 of the disk drives. As illustrated in the image of the rear view 78 of the disk enclosure 22, the storage system management device 46 provides graphical images of the controllers or link control cards 84 carried by the disk enclosure 22 and graphical images of the power/cooling modules 86 carried by the disk enclosure 22. Additionally, for each of the images of the front and rear views 76, 78 of a given storage system component, as provided by the storage system management device 46, the location and orientation of the subcomponents within the image correspond to an actual, physical location and orientation of the subcomponents as carried by the component within the data storage system 20. For example, in the image of the rear view 78 the disk enclosure "Bus 0 Enclosure 0" provided by the storage system management device 46, the location and orientation of the images of a first power/cooling module 86-1, a first controller 84-1, a second controller 84-2, and a second power/cooling module 86-2 correspond to the physical location and orientation of the controllers and power/cooling modules carried by the disc enclosure 22 in the data storage system 20.

As indicated above, the storage system management device 46 provides an end-user with a storage system interface 70 that displays a tree table 52 of the hardware components included within a data storage system 20 and corresponding graphical images of the hardware components 54 selected from the tree table 52. By displaying a graphical image of a selected component, storage system management device 46 allows the end-user to visually identify the corresponding physical component in the data storage system 20. For example, in the case where a component in the data storage system 20 becomes faulty, by displaying the graphical image of the component on the storage system interface 70, the storage system management device 46 can aid the end-user in identifying where a faulty component is located in the data storage system 20.

While the storage system management device 46 is configured to provide an end-user with graphical images of components and subcomponents of a data storage system 20, the storage system management device 46 can also be configured to provide an end user with additional information regarding the data storage system 20. In one arrangement, the storage system management device 46 is configured to provide a graphical representation of the location of a selected subcomponent within a given component's chassis.

Figure 5:
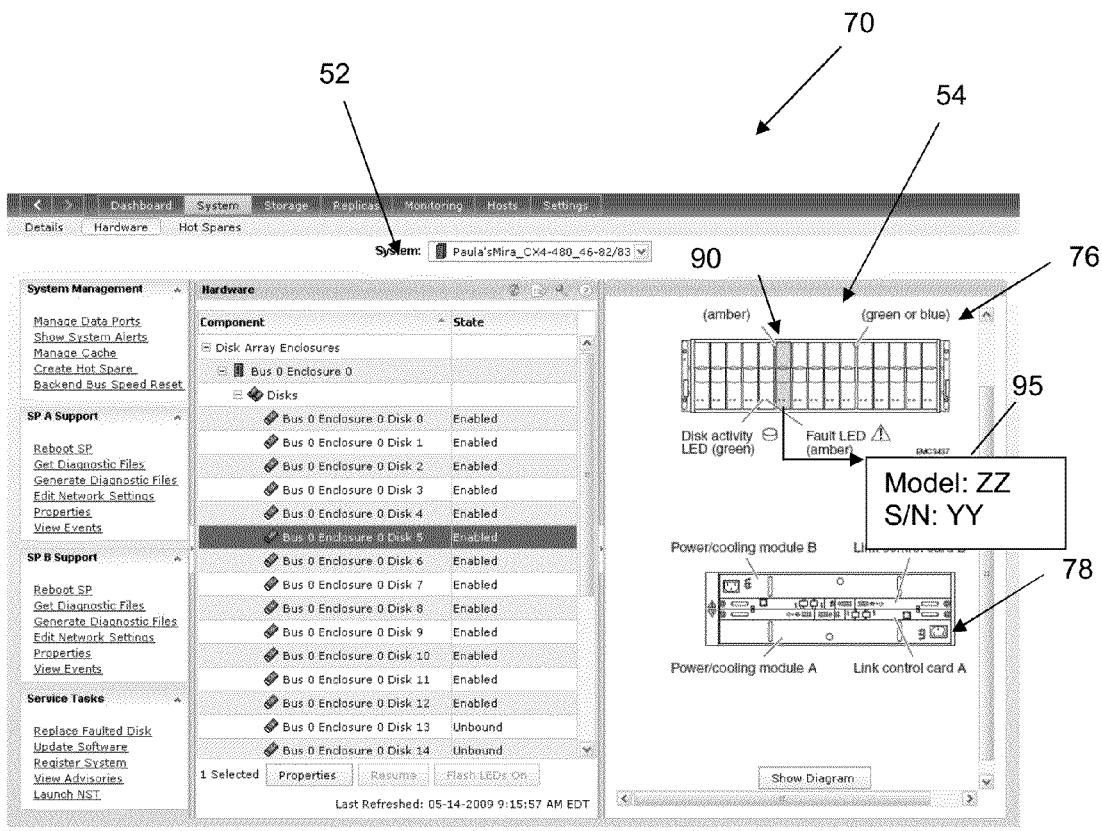
FIG. 5 illustrates a storage system interface as provided by the storage system management device of FIG. 1, the storage system interface displaying a tree table of a selected component of the data storage system of FIG. 1 and the hardware component selected from the tree table.

For example, FIG. 5 illustrates a storage system interface 70 that displays a tree table 52 and the front and rear views 76, 78 of the disk enclosure 22. In response to user input, the storage system management device 46 displays an expanded tree table 52, listing the subcomponents carried by the disk enclosure 22. For example, for the selected "Disks" of "Bus 0 Enclosure 0," as illustrated, the storage system management device 46 provides as part of the tree table 52 a listing of all of the disks carried by the disk enclosure 22.

In order to provide an end-user with location information regarding a particular subcomponent of the illustrated component, the storage system management device 46 first receives a subcomponent selection command based upon selection of the at least one subcomponent from the tree table 52. For example, an end user scrolls a cursor over a subcomponent in the tree table 52, such as the subcomponent labeled "Bus 0 Enclosure 0 Disk 5" and generates a selection command, such as by clicking on the "Bus 0 Enclosure 0 Disk 5" entry using an input tool, such as a keyboard or a mouse. In response, to receiving the selection command, the storage system management device 46 marks the selected subcomponent in the graphical image 54 provided as part of the storage system interface 70. For example, when the user clicks on the "Bus 0 Enclosure 0 Disk 5" entry in the tree table 52, the storage system management device 46 highlights 90 the corresponding Bus 0 Enclosure 0 Disk 5 subcomponent in the graphical image 54 of the disk enclosure 22. With such an arrangement, the storage system management device 46 allows the user to locate and visualize a particular subcomponent carried within a given component's chassis.

Figure 6:
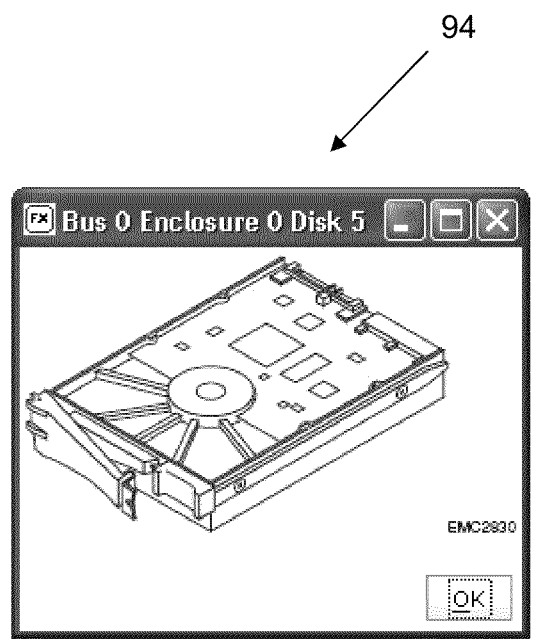
FIG. 6 illustrates a graphical image of a selected subcomponent of the hardware component of FIG. 5.

The storage system management device 46 is configured to provide additional details regarding a subcomponent selected from the tree table 52. In one arrangement, the storage system management device 46 is configured to generate a detailed line drawing of the selected component. In use, the storage system management device 46 initially receives a subcomponent expansion command for a selected subcomponent. With reference to FIG. 5, for example, the storage system interface 70 provides a "Show Diagram" button 92. When a user clicks on the "Show Diagram" button 92, such an action generates the subcomponent expansion command related to the selected subcomponent, Bus 0 Enclosure 0 Disk 5. In response to receiving the subcomponent expansion command, the storage system management device 46 outputs a graphical image of the selected subcomponent. For example, FIG. 6 illustrates a graphical image 94 of the selected subcomponent, Bus 0 Enclosure 0 Disk 5. In the arrangement shown, the storage system management device 46 provides a detailed line drawing of the selected component. By providing the graphical image 94 of the selected subcomponent, the storage system management device 46 allows an end-user to visualize a particular subcomponent as carried within a given component's chassis.

In one arrangement, the storage system management device 46 is configured to provide detailed information (i.e., serial number, model number, etc.) information relating to a selected subcomponent from the tree table 52. For example, returning to FIG. 5, the storage system management device 46 is configured to display an information message 95 related to a selected subcomponent. In use, assume an end-user wanted information related to the model number and serial number associated with the selected Bus 0 Enclosure 0 Disk 5. To cause the storage system management device 46 to provide the information message 95, the end-user initially scrolls over the highlighted component 90 shown in the graphical image 54 of the disk enclosure 22 and transmits a subcomponent information command to the storage system management device 46, such as by clicking on the highlighted 95 Bus 0 Enclosure 0 Disk 5 using an input tool, such as a keyboard or a mouse. In response to the subcomponent information command, the storage system management device 46 outputs or displays the information message 95 related to the Bus 0 Enclosure 0 Disk 5 where the information message 95 includes the model number and the serial number of the Bus 0 Enclosure 0 Disk 5 subcomponent. In one arrangement, while the user can transmit the subcomponent information command to the storage system management device 46, such as by clicking on the highlighted component 90, the user can also transmit the subcomponent information command by hovering the cursor or mouse over the highlighted component 90 after a certain period of time. In response to such hovering, after expiration of the time period, the storage system management device 46 displays the information message 95 (e.g., a hover message or tool tip text) for a given time duration.

Figure 7:
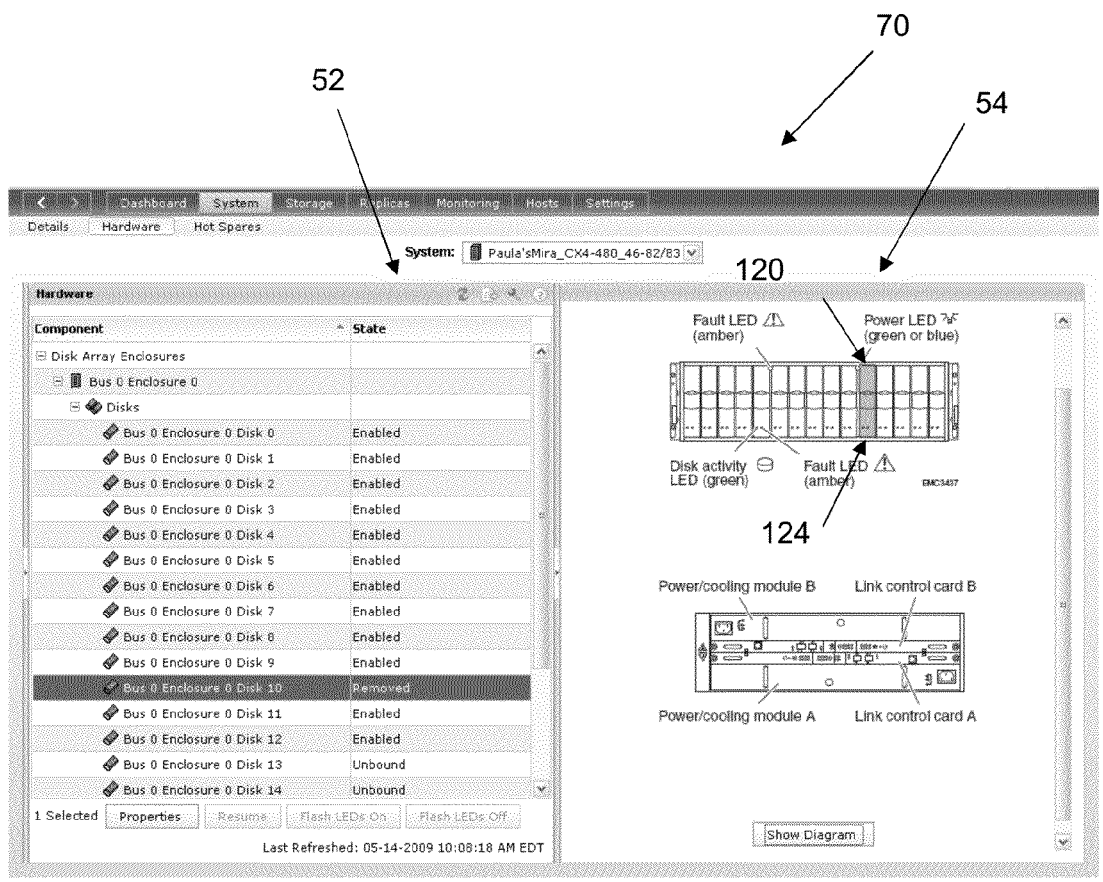
FIG. 7 illustrates a storage system interface as provided by the storage system management device of FIG. 1, the storage system interface displaying a graphical image of a faulted subcomponent of the data storage system of FIG. 1.
Figure 8:
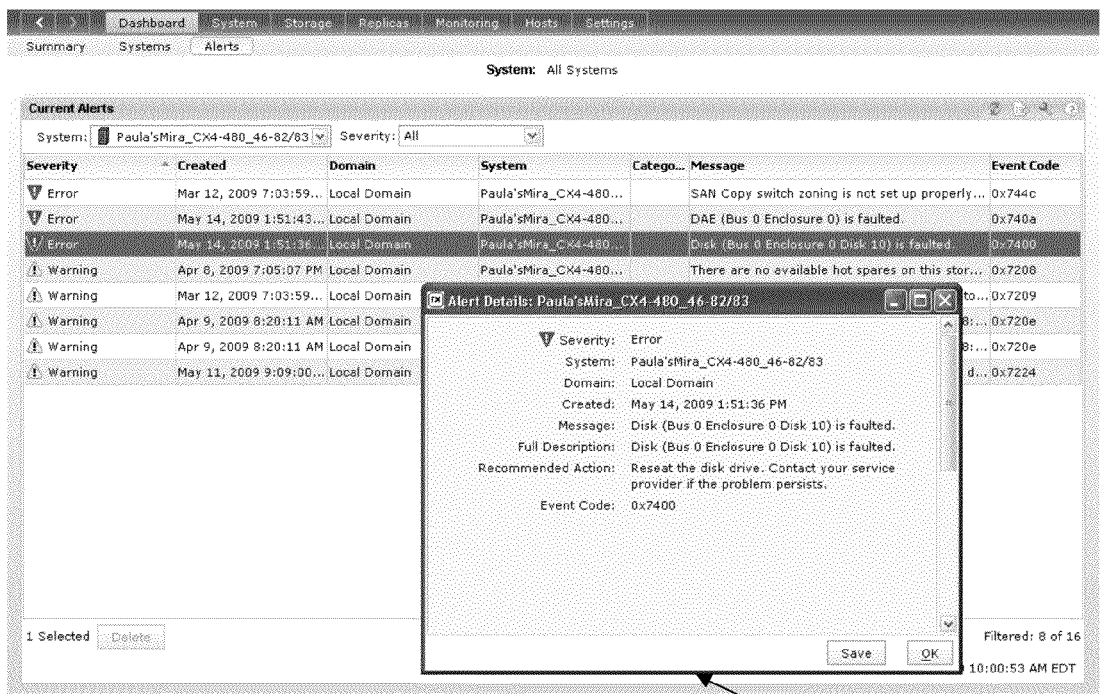
FIG. 8 illustrates a storage system interface as provided by the storage system management device of FIG. 1, the storage system interface displaying an instruction notification regarding correction of operation of a faulted subcomponent of the data storage system of FIG. 1.

In certain cases, the components or subcomponents of the data storage system 20 can become inoperative for a variety of reasons. In one arrangement, the storage system management device 46 is configured to monitor the data storage system 20 for faults of the components and/or subcomponents carried by the system 20 and to report the faults to the user via the storage system interface 70. For example, with reference to FIG. 1, as the storage system management device 46 monitors the data storage system 20, in the event of a fault of either a component or a subcomponent of the system, the storage system management device 46, the system 20 sends an alert notification 120 to the storage system management device 46. While the alert notification 120 can be configured in a variety of ways, in one arrangement, the alert notification 120 is configured to indicate to the storage system management device 46, the particular component or subcomponent that generated the fault and the status of the component or subcomponent resulting from the fault. In response to the alert notification 120, the storage system management device 46 is configured to provide to an end-user an indication of the faulted component or subcomponent, via the storage system interface 70. For example, as illustrated in FIG. 7, in response to the alert notification 120, the storage system management device 46 displays a graphical image 122 of the disk enclosure 22 and marks or highlights 124 the faulted subcomponent, such as Bus 0 Enclosure 0 Disk 10 and, as illustrated in FIG. 8, provides an instruction notification 126 regarding correction of operation of the at least one subcomponent associated with the alert notification 120. In one arrangement, the storage system management device 46 highlights the faulted component using a colored highlight, such as a red color, to indicate the component as faulted. By providing such a display, the storage system management device 46 provides an end-user with a visual indication regarding a faulted component or subcomponent within a data storage system 20 as well as directions for correcting the fault.

While various embodiments of the invention have been particularly shown and described, it will be understood by those skilled in the art that various changes in form and details may be made therein without departing from the spirit and scope of the invention as defined by the appended claims.

Figure 9:
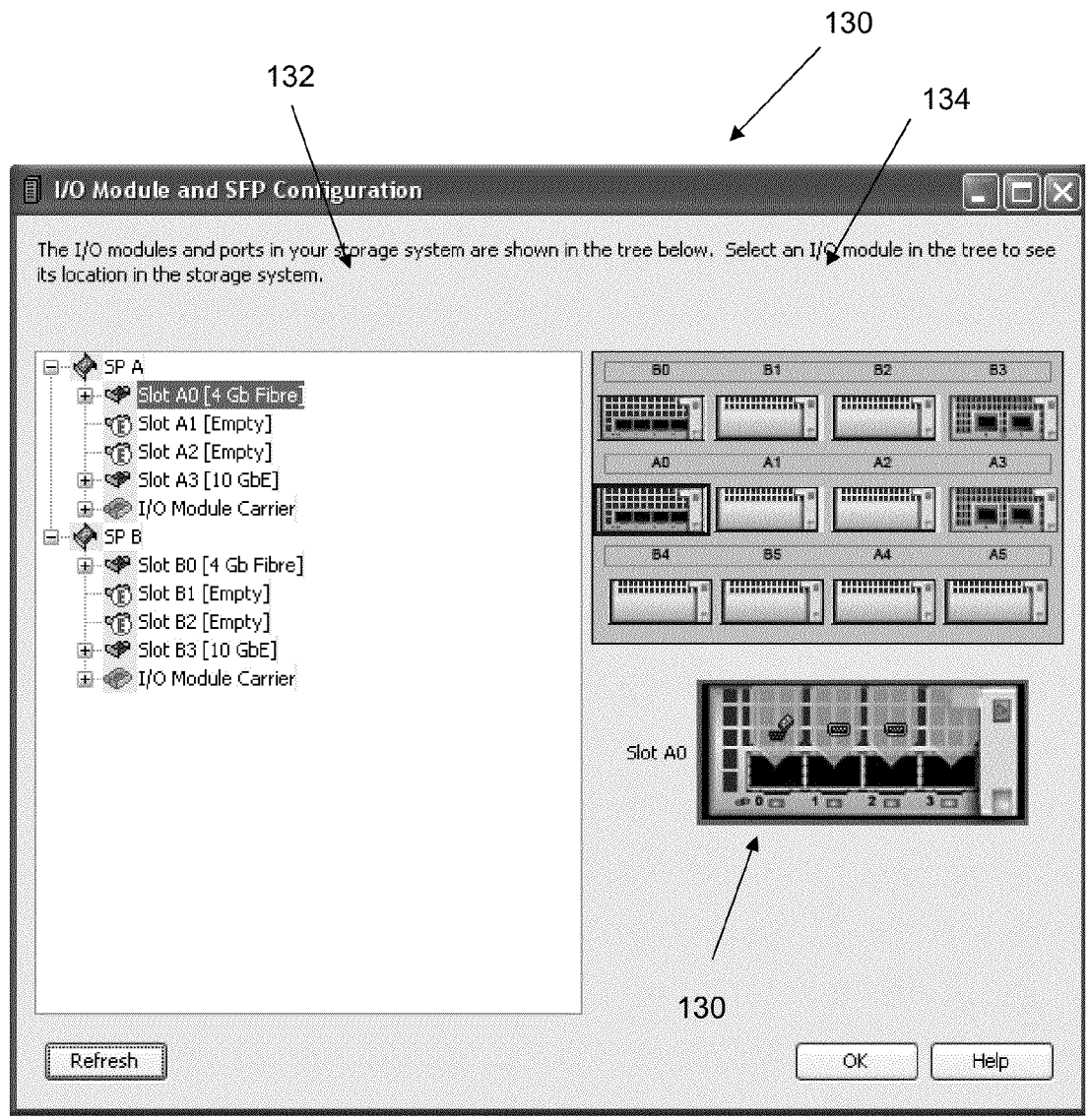
FIG. 9 illustrates a storage system interface as provided by the storage system management device of FIG. 1, the storage system interface displaying a tree table of the ports and modules of a disk processor enclosure and a graphical image of the ports and modules of the disk processor enclosure.

For example, as indicated above, storage system management device 46 is configured to generate a storage system interface 70 that includes an image of a tree table 52 listing the hardware components of the data storage system 20 and an image of a corresponding hardware diagram 54 of a hardware component, such as a disk enclosure 22, selected from the tree table. In one arrangement, as illustrated in FIG. 9, the storage system management device 46 is also configured to generate a storage system interface 130, that includes an image of a tree table 132 listing the hardware components of the disk processor enclosure 24 an image of a corresponding hardware diagram 134 of the ports and modules associated with the disk processor enclosure 24. In use, when a user installs or replaces a set of ports and modules in the storage processor enclosure, the storage system management device 46 generates the storage system interface 130 to provide the user with a graphical image of the hardware configuration of the ports and modules of the disk processor enclosure 24. Additionally, as the user selects certain ports or modules provided in the hardware diagram 134, the storage system management device 46 displays an enlarged or detailed view of the selected port or module 136.

With respect to the data storage system 20 illustrated in FIG. 1, and as indicated above, the disk enclosures 22 and the disk processor enclosure 24 are installed within a single rack enclosure (not shown) with the storage system management device 46 electrically coupled to the components in the single enclosure. Such indication is by way of example only. In one arrangement, the storage system management device 46 is electrically coupled to multiple rack enclosures, where each rack enclosure includes disk enclosures 22 and a disk processor enclosure 24.

As indicated above, FIG. 5 illustrated a graphical image of a selected subcomponent of a disk enclosure 22. However, in certain cases, each disk slot of a disk enclosure 22 may not include a disk drive. In such a case, when a selected subcomponent of the data storage system 20 is nonexistent, the storage system management device 46 provides, as part of the storage system interface 70, an overlay of the selected subcomponent denoting that the slot for the subcomponent is empty. Also, if the detailed subcomponent diagram is being displayed, such as illustrated in FIG. 6, the storage system management device 46 will generate an overlay to denote that the subcomponent slot is empty.

What is claimed is:

1. In a storage system management device, a method for graphically displaying a component of a data storage system, comprising:
   mapping, by the storage system management device, each component of a set of components of the data storage system to at least one graphical image of the component, including mapping a first component of the data storage system to a first set of graphical images and mapping a second component of the data storage system to a second set of graphical images, the second set of graphical images being different from the first set of graphical images;
   displaying, by the storage system management device, a tree table of the set of components of the data storage system; and
   outputting, by the storage system management device, at least one graphical image of a component of the set of components selected from the tree table,
   wherein the component of the set of components selected from the tree table is one of the first component of the data storage system and the second component of the data storage system;
   wherein the component of the data storage system comprises at least one subcomponent;
   wherein displaying, by the storage system management device, the tree table of the set of components of the data storage system comprises displaying, by the storage system management device, a tree table of the set of components of the data storage system and the at least one subcomponent associated with each component of the set of components; and
   wherein outputting, by the storage system management device, the at least one graphical image of a component selected from the tree table comprises outputting, by the storage system management device, the at least one graphical image of the component selected from the tree table and the at least one subcomponent of the component, the location of the at least one subcomponent relative to the component in the at least one graphical image corresponding to a physical location of the at least one subcomponent relative to the component in the data storage system,
   the method further comprising:
   receiving, by the storage system management device, a subcomponent selection command based upon selection of the at least one subcomponent from the tree table;
   marking, by the storage system management device, the selected at least one subcomponent outputted in the at least one graphical image of the component, based upon the subcomponent selection command;
   transmitting, by the storage system management device, a request message to a disk enclosure of the data storage system to request configuration information;
   receiving, by the storage system management device in response to transmitting the request message, configuration information of the disk enclosure, the configuration information relating to a hardware configuration of the disk enclosure and including physical location and orientation of subcomponents of the disk enclosure relative to the disk enclosure;
   providing a graphical image database containing preconfigured images of disk enclosures; and
   searching the graphical image database, by applying the received configuration information, to identify a preconfigured image of a disk enclosure having characteristics that match the received configuration information for the disk enclosure.

2. The method of claim 1, comprising:
   receiving, by the storage system management device, a subcomponent expansion command for the selected at least one subcomponent; and
   outputting, by the storage system management device, at least one graphical image of the selected at least one subcomponent based upon the subcomponent expansion command.

3. The method of claim 1, comprising:
   receiving, by the storage system management device, an alert notification related to the at least one subcomponent of the component of the data storage system, the alert notification associated with a status of the at least one subcomponent; and
   marking, by the storage system management device, the at least one subcomponent associated with the alert notification outputted in the at least one graphical image of the component, based upon the alert notification.

4. The method of claim 3, comprising outputting, by the storage system management device, instructions regarding correction of operation of the at least one subcomponent associated with the alert notification.

5. The method of claim 1, comprising:
   receiving, by the storage system management device, a subcomponent information command for the at least one subcomponent; and
   outputting, by the storage system management device, information related to the at least one subcomponent based upon the subcomponent information command.

6. The method of claim 1, wherein outputting, by the storage system management device, the at least one graphical image of the component of the set of components selected from the tree table comprises outputting, by the storage system management device, a first graphical image of the component of the set of components selected from the tree table, the first graphical image of the component representing a front view of the component, and a second graphical image of the component of the set of components selected from the tree table, the second graphical image of the component representing a rear view of the component, the rear view opposing the front view.

7. The method of claim 1, wherein outputting, by the storage system management device, the at least one graphical image of the component of the set of components of the data storage system selected from the tree table comprises outputting, by the storage system management device, at least one graphical image of a disk enclosure selected from the tree table.

8. The method of claim 1, wherein outputting, by the storage system management device, the at least one graphical image of the component of the set of components of the data storage system selected from the tree table comprises outputting, by the storage system management device, at least one graphical image of a storage processor selected from the tree table.

9. A storage system management device of a data storage system, comprising:
at least one communications interface; and
a controller electrically coupled to the at least one communications interface wherein the controller is configured to:
map each component of a set of components of the data storage system to at least one graphical image of the component, including being configured to map a first component of the data storage system to a first set of graphical images and to map a second component of the data storage system to a second set of graphical images, the second set of graphical images being different from the first set of graphical images;
display a tree table of the set of components of the data storage system; and
output at least one graphical image of a component of the set of components selected from the tree table,
wherein the component of the set of components selected from the tree table is one of the first component of the data storage system and the second component of the data storage system;
wherein the component of the data storage system comprises at least one subcomponent;
wherein when displaying the tree table of the set of components of the data storage system, the controller is configured to display a tree table of the set of components of the data storage system and the at least one subcomponent associated with each component of the set of components; and
wherein when outputting the at least one graphical image of a component selected from the tree table, the controller is configured to output the at least one graphical image of the component selected from the tree table and the at least one subcomponent of the component, the location of the at least one subcomponent relative to the component in the at least one graphical image corresponding to a physical location of the at least one subcomponent relative to the component in the data storage system, detect whether any slots for subcomponents of the selected component are empty, and apply an overlay to the graphical image of the selected component in a location of the graphical image corresponding to the empty slot location to graphically show that the slot is empty,
wherein the controller is further configured to:
receive a subcomponent selection command based upon selection of the at least one subcomponent from the tree table; and
mark the selected at least one subcomponent outputted in the at least one graphical image of the component, based upon the subcomponent selection command.

10. The storage system management device of claim 9, wherein the controller is configured to:
receive a subcomponent expansion command for the selected at least one subcomponent; and
output at least one graphical image of the selected at least one subcomponent based upon the subcomponent expansion command.

11. The storage system management device of claim 9, wherein the controller is configured to:

receive an alert notification related to the at least one subcomponent of the component of the data storage system, the alert notification associated with a status of the at least one subcomponent; and
mark the at least one subcomponent associated with the alert notification outputted in the at least one graphical image of the component, based upon the alert notification.

12. The storage system management device of claim 10, wherein the controller is configured to output instructions regarding correction of operation of the at least one subcomponent associated with the alert notification.

13. The storage system management device of claim 9, wherein the controller is configured to:
receive a subcomponent information command for the at least one subcomponent; and
output information related to the at least one subcomponent based upon the subcomponent information command.

14. The storage system management device of claim 9, wherein when outputting the at least one graphical image of the component of the set of components selected from the tree table, the controller is configured to output a first graphical image of the component of the set of components selected from the tree table, the first graphical image of the component representing a front view of the component, and a second graphical image of the component of the set of components selected from the tree table, the second graphical image of the component representing a rear view of the component, the rear view opposing the front view.

15. A computer program product having a non-transient computer-readable medium including computer program logic encoded thereon that, when performed on a controller of a storage system management device causes the storage system management device to:
map each component of a set of components of the data storage system to at least one graphical image of the component, including to map a first component of the data storage system to a first set of graphical images and to map a second component of the data storage system to a second set of graphical images, the second set of graphical images being different from the first set of graphical images;
display a tree table of the set of components of the data storage system;
output at least one graphical image of a component of the set of components selected from the tree table, wherein the component of the set of components selected from the tree table is one of the first component of the data storage system and the second component of the data storage system;
when displaying the tree table of the set of components of the data storage system, display a tree table of the set of components of the data storage system and at least one subcomponent associated with each component of the set of components; and
when outputting the at least one graphical image of a component selected from the tree table, output the at least one graphical image of the component selected from the tree table and the at least one subcomponent of the component, the location of the at least one subcomponent relative to the component in the at least one graphical image corresponding to a physical location of the at least one subcomponent relative to the component in the data storage system,
wherein the computer program logic further causes the storage system management device to:

receive a subcomponent selection command based upon selection of the at least one subcomponent from the tree table;

mark the selected at least one subcomponent outputted in the at least one graphical image of the component, based upon the subcomponent selection command;

transmit, by the storage system management device, a request message to a disk enclosure of the data storage system to request configuration information;

receive, by the storage system management device in response to transmitting the request message, configuration information of the disk enclosure, the configuration information relating to a hardware configuration of the disk enclosure and including physical location and orientation of subcomponents of the disk enclosure relative to the disk enclosure;

provide a graphical image database containing preconfigured images of disk enclosures; and search the graphical image database, by applying the received configuration information, to identify a preconfigured image of a disk enclosure having characteristics that match the received configuration information for the disk enclosure.

16. The method of claim 1, wherein the configuration information further includes a model of the disk enclosure and a serial number of the disk enclosure, and wherein the subcomponents of the disk enclosure about which physical location and orientation are specified include disk drives, status indicators, ports, and controllers.

17. The method of claim 1, wherein outputting at least one graphical image of a selected component of the data storage system includes:

determining whether any slots for subcomponents of the selected component are empty; and applying an overlay to the graphical image of the selected component in a location of the graphical image corresponding to the empty slot location to graphically show that the slot is empty.

18. In a storage system management device, a method for graphically displaying components of a data storage system, comprising:

providing a graphical image database containing preconfigured images of components;

transmitting, by the storage system management device, a request message to each of a set of components of the data storage system to request configuration information from each respective component;

receiving, by the storage system management device in response to transmitting a request message to each of the set of components, configuration information from the set of components, the configuration information for each of the set of components relating to a hardware configuration of the respective component and including physical location and orientation of subcomponents of the component relative to the component;

for each component of the set of components, searching the graphical image database, by applying the received configuration information, to identify a preconfigured image having characteristics that match the received configuration information for the respective component;

mapping, by the storage system management device, each component of the set of components to the preconfigured image identified for the component, including mapping a first component of the data storage system to a first preconfigured image and mapping a second component of the data storage system to a second preconfigured image, the second preconfigured image being different from the first preconfigured image;

displaying, by the storage system management device, a tree table of a set of components of the data storage system, including displaying subcomponents of different components of the set of components;

outputting, by the storage system management device, the preconfigured image mapped to a component of the set of components selected from the tree table, the preconfigured image indicating a location of a subcomponent of the selected component corresponding to a physical location of the subcomponent relative to the component in the data storage system;

receiving, by the storage system management device, a subcomponent selection command based upon a selection of a subcomponent from the tree table; and marking, by the storage system management device, the selected subcomponent in the preconfigured image of the component, in response to the subcomponent selection command.

19. The method of claim 18, further comprising detecting whether the selected subcomponent of the data storage system is non-existent, and wherein outputting the preconfigured image of the selected component of the data storage system includes:

generating an overlay of the selected subcomponent; and applying the overlay to the preconfigured image of the selected component in a location of the preconfigured image corresponding to the nonexistent selected subcomponent to graphically show that a slot for the nonexistent selected subcomponent is empty.

* * * * *